(12) United States Patent
Kawachi

(10) Patent No.: US 11,921,816 B2
(45) Date of Patent: Mar. 5, 2024

(54) INFORMATION PROCESSING APPARATUS THAT SPECIFIES A SUBJECT AND METHOD, IMAGE CAPTURING APPARATUS, AND IMAGE CAPTURING SYSTEM

(71) Applicant: CANON KABUSHIKI KAISHA, Tokyo (JP)

(72) Inventor: Shuhei Kawachi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 17/369,015

(22) Filed: Jul. 7, 2021

(65) Prior Publication Data

US 2022/0019851 A1 Jan. 20, 2022

(30) Foreign Application Priority Data

Jul. 16, 2020 (JP) ................................ 2020-122345

(51) Int. Cl.
*G06F 18/214* (2023.01)
*G06F 18/40* (2023.01)
*G06N 5/04* (2023.01)
*G06N 20/00* (2019.01)
(Continued)

(52) U.S. Cl.
CPC ............ *G06F 18/214* (2023.01); *G06F 18/41* (2023.01); *G06N 5/04* (2013.01); *G06N 20/00* (2019.01); *G06T 7/248* (2017.01); *H04N 23/635* (2023.01); *G06T 2207/20081* (2013.01); *G06V 2201/07* (2022.01); *G06V 2201/08* (2022.01)

(58) Field of Classification Search
CPC ......... G06F 18/214; G06F 18/41; G06N 5/04; G06N 20/00; G06N 5/01; G06N 7/01; G06N 3/08; G06N 20/10; G06T 7/248; G06T 2207/20081; G06T 2207/20084; G06T 7/246; G06T 7/73; H04N 23/635; H04N 23/61; G06V 2201/07; G06V 2201/08; G06V 10/235; G06V 20/00
See application file for complete search history.

(56) References Cited

U.S. PATENT DOCUMENTS

2018/0211138 A1* 7/2018 Yamada ................. G06V 20/64
2019/0149752 A1* 5/2019 Takahashi ............ H04N 23/617
348/222.1

(Continued)

FOREIGN PATENT DOCUMENTS

JP 6441980 B2 12/2018
JP 2019075130 A 5/2019

*Primary Examiner* — Gevell V Selby
(74) *Attorney, Agent, or Firm* — ROSSI, KIMMS & McDOWELL LLP

(57) ABSTRACT

An information processing apparatus comprises: a storage unit that stores a first image acquired in response to a shooting instruction and a plurality of second images automatically acquired before the first image; a specifying unit that specifies a subject in the first image; a detection unit that detects the subject specified by the specifying unit in the plurality of second images acquired before the first image; and a control unit that controls to adapt a plurality of sets each contains information on a region of the subject detected in each of the plurality of second images and the second image associated with the information as learning data.

13 Claims, 9 Drawing Sheets

(51) Int. Cl.
*G06T 7/246* (2017.01)
*H04N 23/63* (2023.01)

(56) References Cited

U.S. PATENT DOCUMENTS

2020/0193585 A1* 6/2020 Ikegami .............. G06N 20/00
2021/0150185 A1* 5/2021 Kitagawa ............ G06V 10/772

* cited by examiner

INFORMATION PROCESSING APPARATUS THAT SPECIFIES A SUBJECT AND METHOD, IMAGE CAPTURING APPARATUS, AND IMAGE CAPTURING SYSTEM

BACKGROUND OF THE INVENTION

Field of the Invention

The present invention relates to an information processing apparatus and method, image capturing apparatus, and image capturing system and, more particularly, to an information processing apparatus and method, image capturing apparatus, and image capturing system that perform machine learning for detecting a subject from a shot image.

Description of the Related Art

In recent years, with the development of deep learning technology and the like, the development of object recognition technique for images by machine learning has been more actively carried out. For example, in a digital camera, such an object recognition technique is applied in order to detect a subject from images acquired in live view shooting, automatically focus on the subject (AF), and follow the subject.

Machine learning is divided into a learning phase and an inference phase, and inference is performed based on dictionary data obtained by learning. In the learning phase for performing object recognition by machine learning, a large number of images with correct labels indicating the target object to be recognized are required.

Japanese Patent Laid-Open No. 2019-75130 discloses a technique for efficiently generating teacher data to be used for machine learning by, using time-series images, using pairs of images and correct labels as training data. This technique is to, in a case where there is a labelled image among sequentially shot images, label images by estimating the position of a subject in the images recorded before the labelled image, thereby performing learning efficiently using the sequentially shot images.

Further, Japanese Patent No. 6441980 discloses a technique for increasing an amount of training data by performing image processing such as inversion, color tone change, enlargement/reduction, translation, distortion deformation, and composition with another image on the original teacher data. By using this technique, it is possible to reduce the number of images to be shot necessary for learning.

In order to perform object recognition with higher accuracy by machine learning, training data of about several thousand to several tens of thousands is required, but in the examples shown in Japanese Patent Laid-Open No. 2019-75130 and Japanese Patent No. 6441980, sufficient training data cannot be obtained.

For example, FIG. 2 shows an example in which a user follows a vehicle 200 as a subject while watching live view (LV) images 201 to 205 and captures a still image 206. When the user selects an image after shooting and labels the vehicle 200 as a subject for learning as described in Japanese Patent Laid-Open No. 2019-75130 and Japanese Patent No. 6441980, the still image 206 is recorded but the LV Images 201-205 are not recorded. In this series of images, if the vehicle 200, which is the subject, can be recognized at an early stage such as at the timing of shooting the LV image 201, appropriate shooting with more appropriate exposure, focus adjustment, and framing can be performed.

However, the shape and size of the appearance of the vehicle 200, which is the subject, changes because the shooting angle and the distance change. Therefore, in a case where training data is generated using the still image 206 and the images recorded before the still image 206 as described in Japanese Patent Laid-Open No. 2019-75130, it is conceivable that the vehicle 200 in a state in the LV image 201 again cannot be recognized accurately. Moreover, such a change in appearance is beyond the scope of training data that can be generated by the image processing in Japanese Patent No. 6441980.

Further, as described in Japanese Patent Laid-Open No. 2019-75130, when the final labeling of an image is performed based on a human visual judgment, a large amount of labor is required, which is also a problem.

SUMMARY OF THE INVENTION

The present invention has been made in consideration of the above situation, and efficiently increases training data that can be used for machine learning for object recognition.

According to the present invention, provided is an information processing apparatus comprising: a storage unit that stores a first image acquired in response to a shooting instruction and a plurality of second images automatically acquired before the first image; a specifying unit that specifies a subject in the first image; a detection unit that detects the subject specified by the specifying unit in the plurality of second images acquired before the first image; and a control unit that controls to adapt a plurality of sets each contains information on a region of the subject detected in each of the plurality of second images and the second image associated with the information as learning data, wherein each unit is implemented by one or more processors, circuitry or a combination thereof.

Further, according to the present invention, provided is an image capturing apparatus comprising: an image sensor; a storage unit that stores a first image acquired in response to a shooting instruction and a plurality of second images automatically acquired before the first image; a specifying unit that specifies a subject in the first image; a detection unit that detects the subject specified by the specifying unit in the plurality of second images acquired before the first image; a control unit that controls to adapt a plurality of sets each contains information on a region of the subject detected in each of the plurality of second images and the second image associated with the information as learning data; a learning unit that generates an inference model for inferring the subject based on the information of the region of the subject detected by the detection unit; and an inference unit that infers the region of the subject in an image shot by the image sensor using the inference model generated by the learning unit, wherein each unit is implemented by one or more processors, circuitry or a combination thereof.

Furthermore, according to the present invention, provided is an image capturing apparatus comprising: an information processing apparatus comprising a storage unit that stores a first image acquired in response to a shooting instruction and a plurality of second images automatically acquired before the first image, a specifying unit that specifies a subject in the first image, a detection unit that detects the subject specified by the specifying unit in the plurality of second images acquired before the first image, and a control unit that controls to adapt a plurality of sets each contains information on a region of the subject detected in each of the plurality of second images and the second image associated with the information as learning data, an image sensor; a learning unit that generates an inference model for inferring the subject based on the information of the region of the subject detected by the detection unit; and an inference unit that infers the region of the subject in an image shot by the image sensor using the inference model generated by the learning unit, wherein each unit is implemented by one or more processors, circuitry or a combination thereof.

Further, according to the present invention, provided is an image capturing system comprising: an information processing apparatus comprising: a storage unit that stores a first image acquired in response to a shooting instruction and a plurality of second images automatically acquired before the first image; a specifying unit that specifies a subject in the first image; a detection unit that detects the subject specified by the specifying unit in the plurality of second images acquired before the first image; and a control unit that controls to adapt a plurality of sets each contains information on a region of the subject detected in each of the plurality of second images and the second image associated with the information as learning data; and an image capturing apparatus comprising: an image sensor; a learning unit that generates an inference model for inferring the subject based on the information of the region of the subject detected by the detection unit; and an inference unit that infers the region of the subject in an image shot by the image sensor using the inference model generated by the learning unit, wherein each unit is implemented by one or more processors, circuitry or a combination thereof.

Further, according to the present invention, provided is an information processing method comprising: storing a first image acquired in response to a shooting instruction and a plurality of second images automatically acquired before the first image in a storage unit; specifying a subject in the first image; detecting the subject specified by the specifying unit in the plurality of second images acquired before the first image; and controlling to adapt a plurality of sets each contains information on a region of the subject detected in each of the plurality of second images and the second image associated with the information as learning data.

Further, according to the present invention, provided is a non-transitory computer-readable storage medium, the storage medium storing a program that is executable by the computer, wherein the program includes program code for causing the computer to function as an information processing apparatus comprising: a storage control unit that controls to store a first image acquired in response to a shooting instruction and a plurality of second images automatically acquired before the first image in a storage unit; a specifying unit that specifies a subject in the first image; a detection unit that detects the subject specified by the specifying unit in the plurality of second images acquired before the first image; and a control unit that controls to adapt a plurality of sets each contains information on a region of the subject detected in each of the plurality of second images and the second image associated with the information as learning data.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
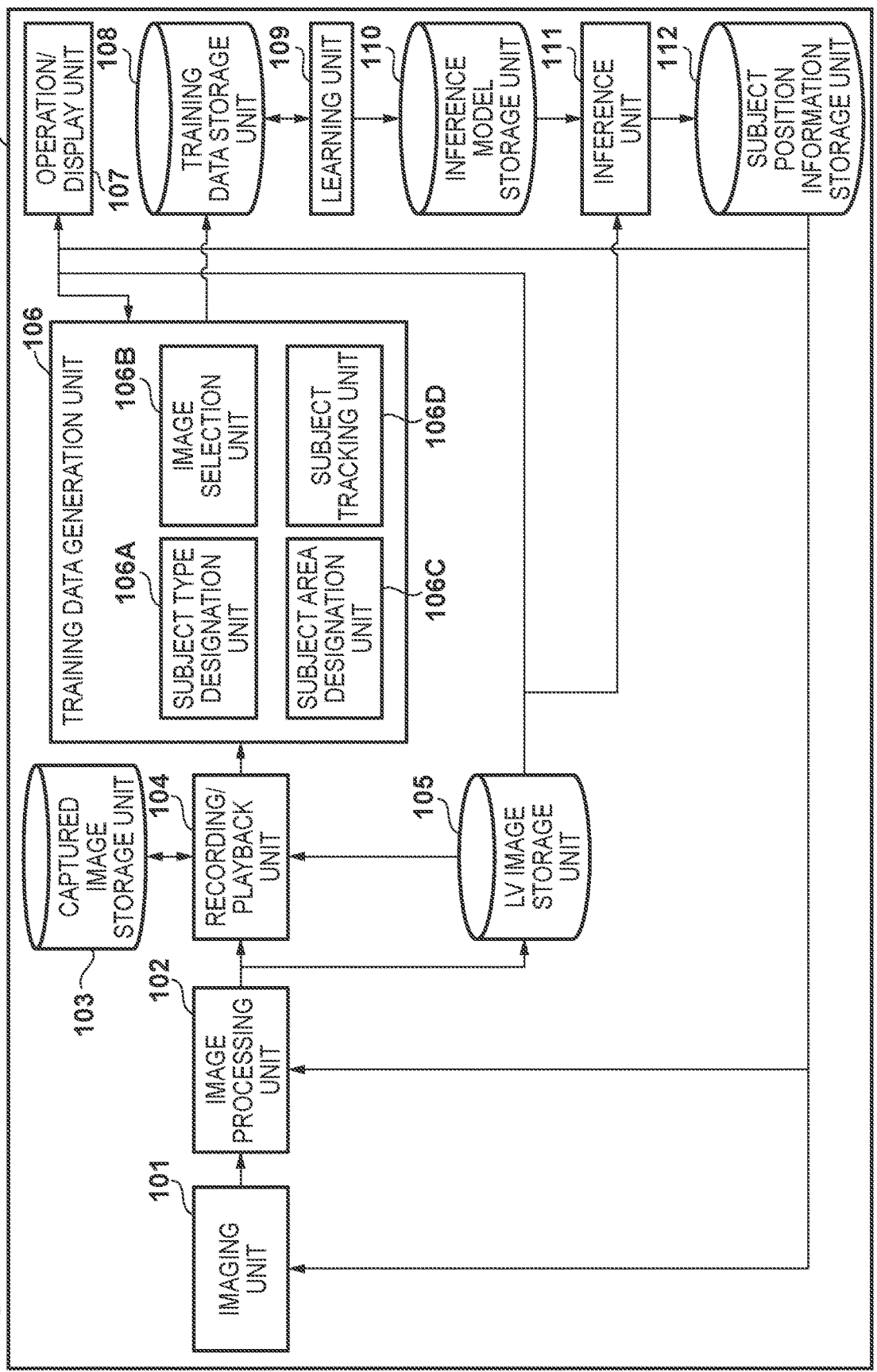
FIG. 1 is a block diagram showing a functional configuration according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram showing a functional configuration of an image capturing apparatus 100 according to an embodiment of the present invention. The image capturing apparatus 100 includes an imaging unit 101, an image processing unit 102, a captured image storage unit 103, a recording/playback unit 104, a live view (LV) image storage unit 105, a training data generation unit 106, an operation/display unit 107, a training data storage unit 108, a learning unit 109, an inference model storage unit 110, an inference unit 111, and a subject position information storage unit 112.

The imaging unit 101 includes an optical system and an image sensor (not shown), and an image of a subject incident through the optical system is photoelectrically converted by the image sensor into video data, and output the video data. The image processing unit 102 performs appropriate image processing on the video data output from the imaging unit 101. The image processing unit 102 is implemented by, for example, a central processing unit (CPU). Alternatively, it may be implemented by a graphics processing unit (GPU) which is good at image processing. Live view (LV) display can be realized by repeating the shooting operation by the imaging unit 101 at a predetermined cycle and sequentially displaying the video data processed by the image processing unit 102 on the operation/display unit 107. The user can shoot a still image after deciding the composition and shooting settings while watching the LV display. The operation/display unit 107 is a display equipped with a touch panel. In the following description, the images acquired for LV display are referred to as LV images.

The captured image storage unit 103 is a non-volatile memory for storing still images and LV images, and the live view (LV) image storage unit 105 is a memory that temporarily stores LV images to be output to the operation/display unit 107 during shooting LV images. The recording/playback unit 104 controls recording and reproduction of video data of still images and LV images that has undergone image processing by the image processing unit 102 to/from the captured image storage unit 103 and the LV image storage unit 105. The recording/playback unit 104 is implemented, for example, by the central processing unit (CPU).

The operation/display unit 107 is a display device (not shown) equipped with a touch panel, which displays LV images temporarily stored in the LV image storage unit 105 and a user interface (hereinafter referred to as UI), and receives operation by the user.

The image capturing apparatus 100 has a learning function and an inference function for detecting a subject from a captured still image and LV images, and the training data generation unit 106 generates training data for detecting the subject. The training data generation unit 106 includes a subject type designation unit 106A, an image selection unit 106B, a subject area designation unit 106C, and a subject tracking unit 106D. The training data generation unit 106 is implemented by, for example, the central processing unit (CPU).

The training data storage unit 108 stores training data generated by the training data generation unit 106 and passes it to the learning unit 109. The learning unit 109 performs learning based on the training data and generates an inference model. The inference model storage unit 110 stores the inference model. The inference unit 111 performs subject detection (inference) on LV images based on the inference model. The subject position information storage unit 112 stores the position of the subject detected by the inference unit 111. Training data storage unit 108 and inference model storage unit 110 are implemented, for example, by non-volatile memory. Further, the learning unit 109 and the inference unit 111 are implemented by, for example, the central processing unit (CPU). Further, it may be implemented by the GPU that is good at matrix operations comparing to the CPU. Alternatively, it may be implemented by the CPU and the GPU in cooperation with each other. Specific algorithms used in the inference model include the nearest neighbor method, the naive Bayes method, a decision tree, and a support vector machine, for example. In addition, deep learning (deep learning) that generates features and coupling weighting coefficients for learning by itself using a neural network may also be used. Any usable algorithm among the above algorithms can be applied to this embodiment as appropriate. In the following description, a case of generating an inference model using deep learning will be described as an example.

In the present embodiment, among still images and LV images, an image used for learning the subject detection is referred to as a "learning image".

(Shooting Function)

The shooting function of the image capturing apparatus 100 will be explained. When the user sets the shooting mode according to the instruction to the operation/display unit 107, the live view operation is started.

During the live view operation, LV images periodically captured by the imaging unit 101 are subjected to appropriate image processing by the image processing unit 102, and then sequentially displayed on the display device of the operate/display unit 107 via the LV image storage unit 105. The LV image storage unit 105 buffers a predetermined number of the latest LV images.

When the user sets the composition and shooting conditions while watching the LV display and instructs to shoot a still image, the following processing is performed. First, the still image captured by the imaging unit 101 undergoes appropriate image processing by the image processing unit 102, and then recorded in the captured image storage unit 103 via the recording/playback unit 104. Further, in order to use the still image as a learning image, a predetermined number of the latest LV images buffered in the LV image storage unit 105 are recorded in association with the still image. This associated data set is hereinafter referred to as "still image with LV images".

Figure 2:
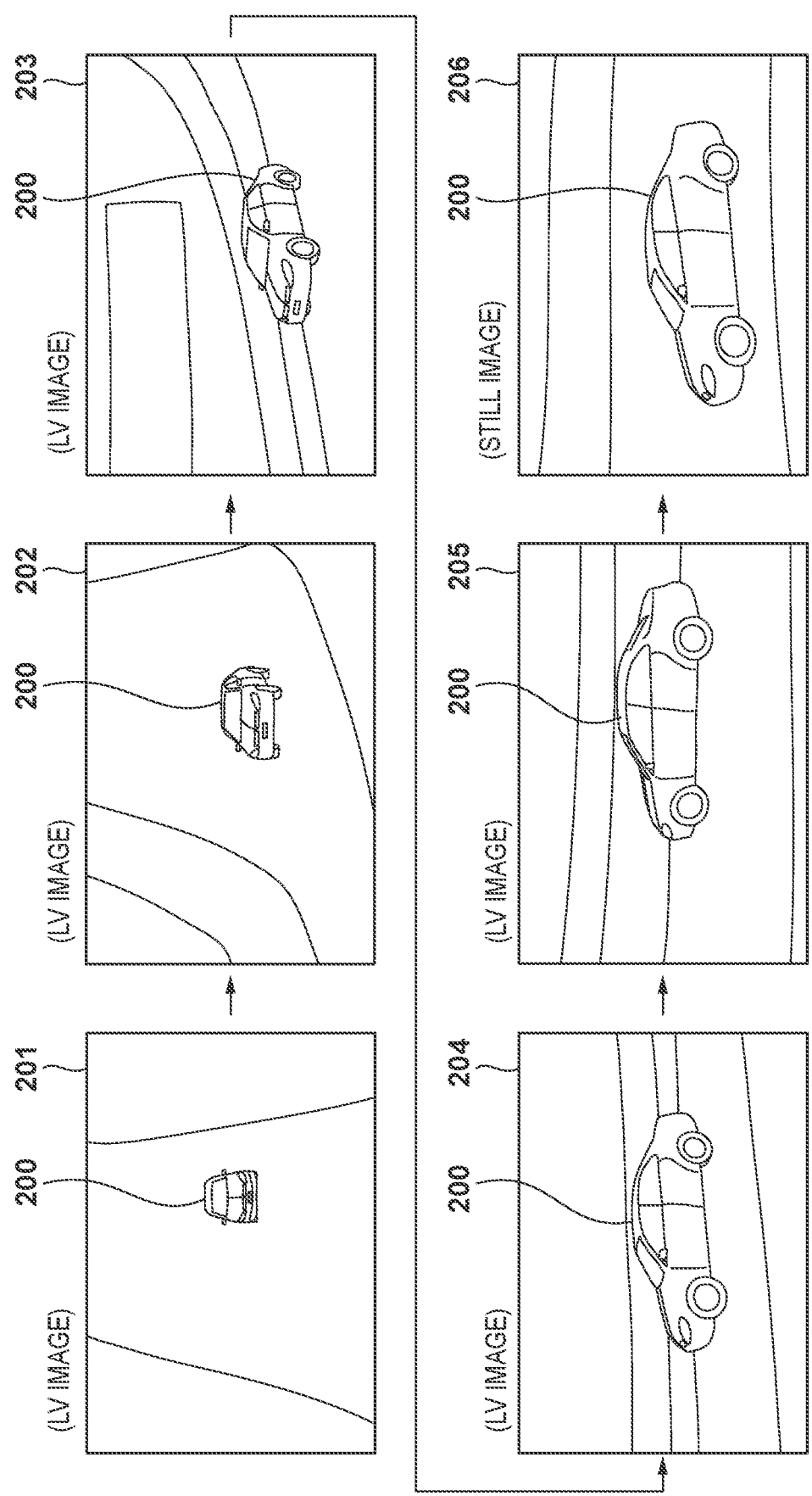
FIG. 2 is a diagram showing an example of a still image and LV images shot before the still image.
Figure 3:
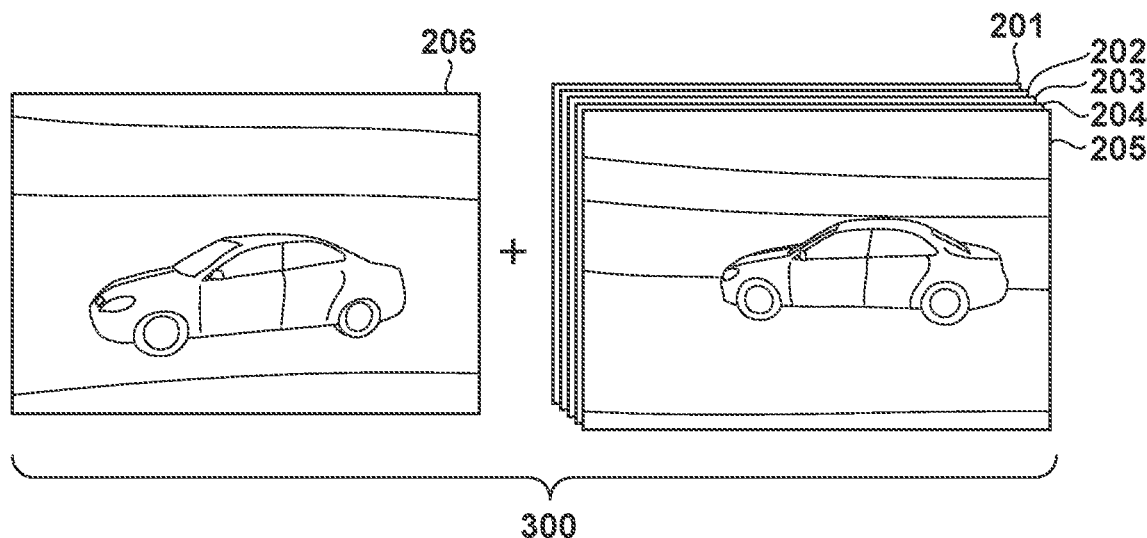
FIG. 3 is a diagram showing an example of a still image accompanied with LV images according to the embodiment.

In the example of images shown in FIG. 2, as shown in FIG. 3, the still image with LV images 300 includes a still image 206 and a plurality of latest LV images 201 to 205. The still image with LV images 300 has both a role as recorded data of the still image 206 taken by the user and a role as learning images for subject detection.

If the captured image does not move, even if the LV images are used as training images, they are not useful as additional training data. Further, it is not efficient to use all the LV images for learning if the difference between the frames of the LV images is small. Therefore, an inter-image difference detection unit (not shown) may be further provided, and when the difference between the LV images is less than a predetermined threshold value, the corresponding LV image may not be recorded.

(About Learning)

Next, the learning function of the image capturing apparatus 100 will be explained. This learning function is to learn to detect a subject as a user specifying the subject in a plurality of still images after shooting them.

Figure 4:
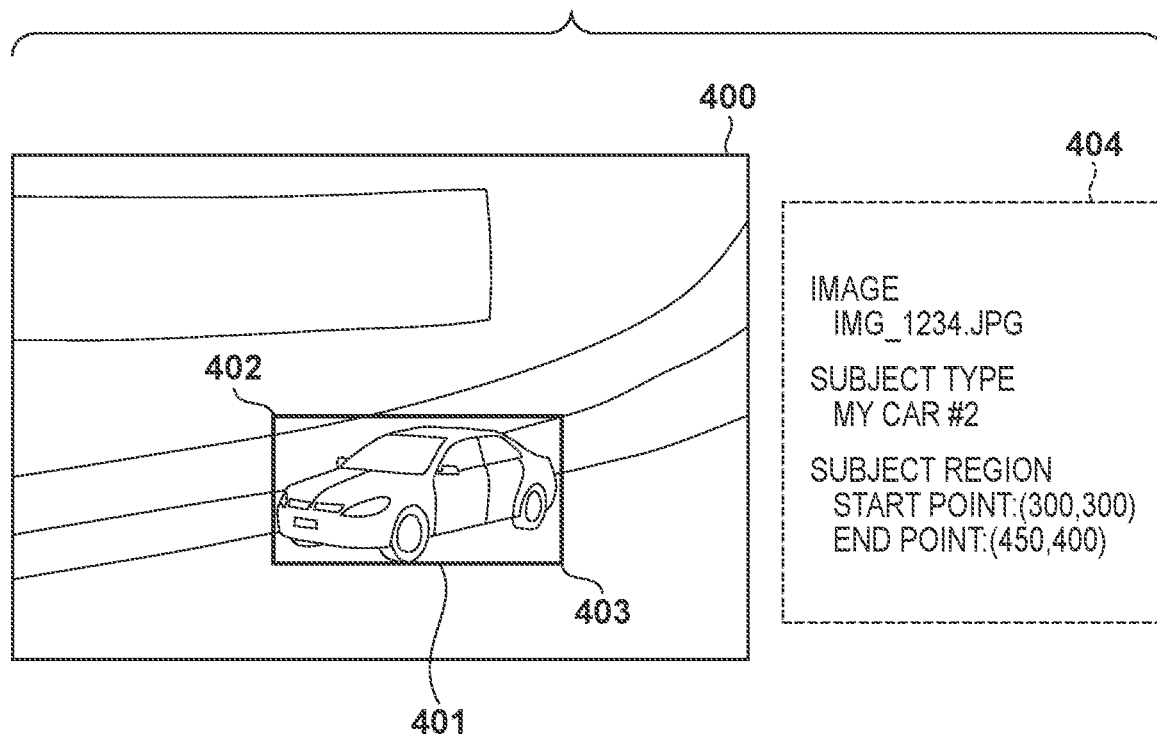
FIG. 4 is a diagram showing a concept of training data for learning according to the embodiment.

The training data for learning the subject detection in the present embodiment is a set of a training image, a subject type, and a position information of the subject in the image. The concept of the learning function will be described with reference to FIG. 4. In this example, the training data includes information of an image 400, a subject type, and a rectangular area 401 that inscribes the subject (vehicle) to be learned in this image. As the data format, as shown in a dotted box 404, there are an image file name, a subject type name, and coordinate values of two points 402 and 403 that are diagonal to the rectangular area 401.

The training data is generated by the training data generation unit 106 based on the still image with LV images and the instruction from the user. Specifically, the subject type designation unit 106A specifies the type of the subject to be learned, and the image selection unit 106B selects a still image to be learned from plural sets of the still image with LV images. Then, training data can be obtained by designating the subject area by the subject area designation unit 106C in the selected still image. Furthermore, the subject area is inferred in each of the LV images associated with the still image by the subject tracking unit 106D, and the inferred subject areas are also used as additional training data. The obtained training data is stored in the training data storage unit 108, and the learning unit 109 performs learning by referring to this training data.

The overall learning process of subject recognition will be described in detail below with reference to the flowchart of FIG. 9.

Figure 5:
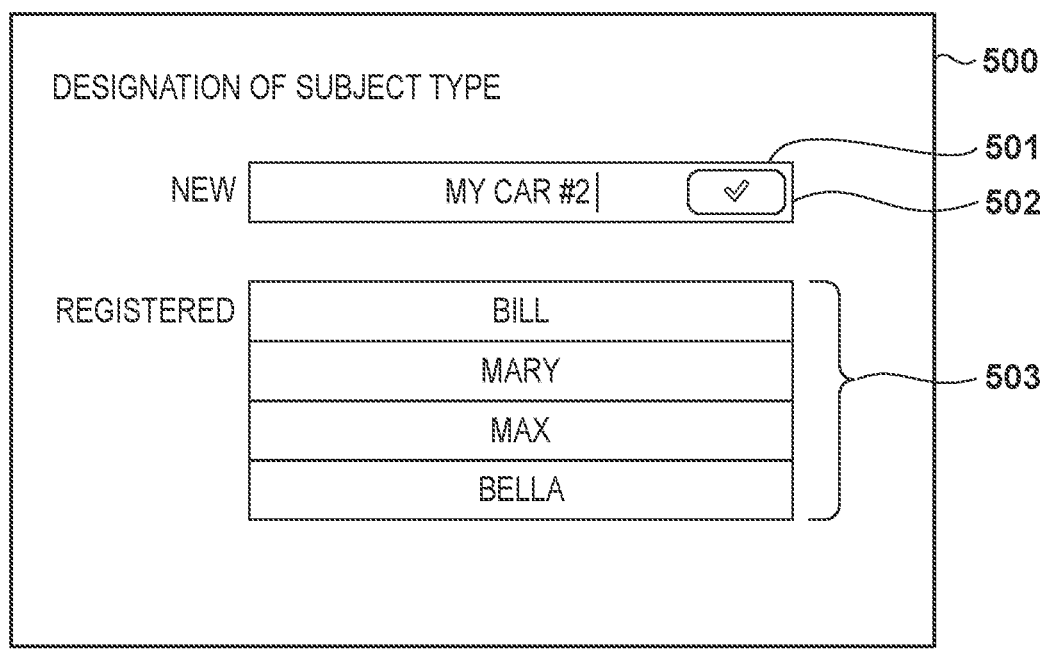
FIG. 5 is a diagram showing an example of a displayed image used for designating a subject type to be learned according to the embodiment.

In step S901, the subject type designation unit 106A performs control for receiving the subject type from a user via the operation/display unit 107. An example of displayed image on the operation/display unit 107 at this time is shown in FIG. 5. If you want to add a new car as a subject, enter the subject type as shown by 501 and tap the confirm button 502 to confirm. In the case where the subject type has been already registered, the subject type is selected from a registered list 503.

Figure 6:
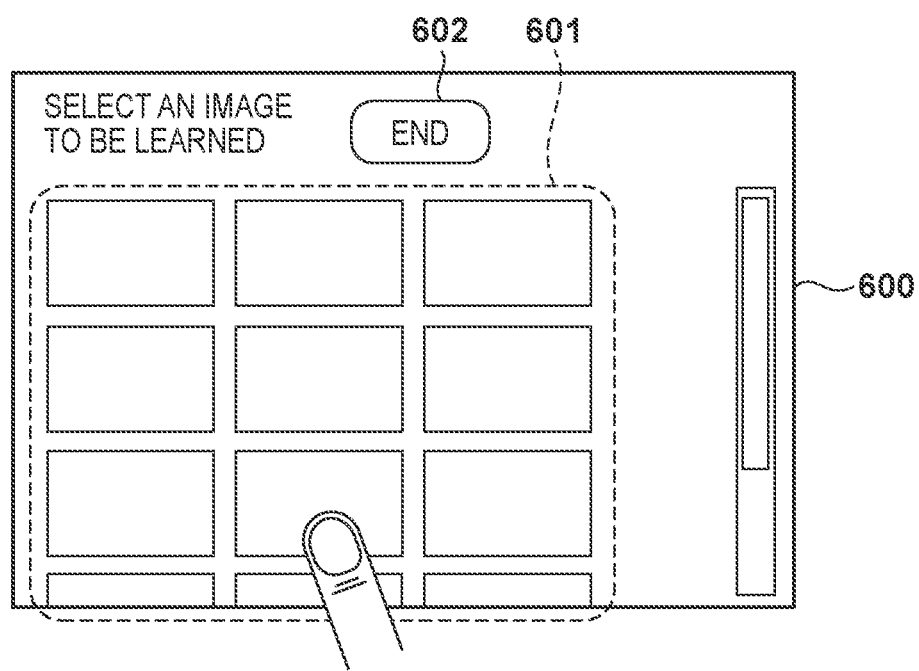
FIG. 6 is a diagram showing an example of displayed contents when selecting an image used for learning according to the embodiment.

Next, in step S902, the image selection unit 106B controls to select an image to be learned. The image selection unit 106B reads the stored still images from the captured image storage unit 103 via the recording/playback unit 104, and displays a list of the still images on the operation/display unit 107. A display example thereof is shown in FIG. 6. A list of images is displayed as thumbnail images in an area 601 in a window 600, and the user can select a still image by tapping the desired image and pressing an end button 602.

Next, in step S903, learning process for subject recognition is performed using the still image with LV images corresponding to the selected still image. Here, the learning process performed in step S903 will be described with reference to the flowchart of FIG. 10.

Figure 7:
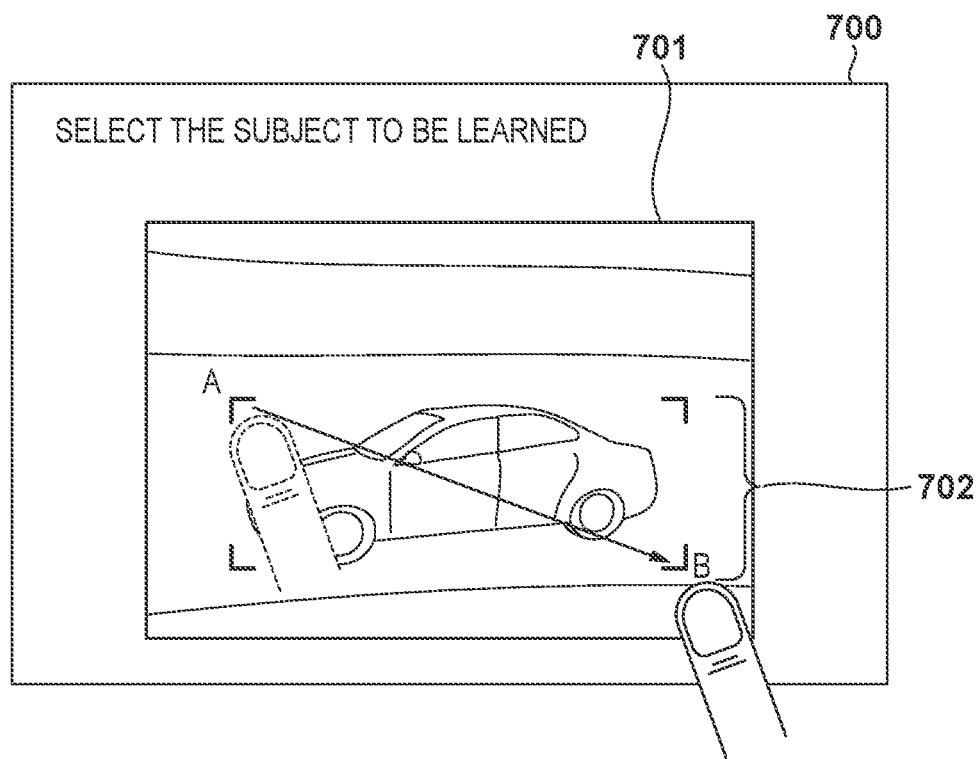
FIG. 7 is a diagram showing an example of an operation for designating a region of a subject to be learned according to the embodiment.

In step S1001, the subject area designation unit 106C controls to acquire the position information of the subject in the selected still image from the user. An operation example performed on the operation/display unit 107 at that time is shown in FIG. 7. In this example, in order to learn the vehicle, first, the selected still image 701 is displayed on the operation/display unit 107. Then, by dragging from the position A to the position B on a touch panel 700 of the operation/display unit 107, a rectangle 702 whose diagonals are A and B inscribing the area of the vehicle is specified. A set of the still image selected in this way, the subject type, and rectangular information representing the subject area constitutes the training data (step S1002).

In the present embodiment, the user himself specifies the rectangular area of the subject, but the present invention is not limited to this. For example, the user taps a part of the subject, and a known contour extraction technique may be used to extract the subject region.

Figure 8:
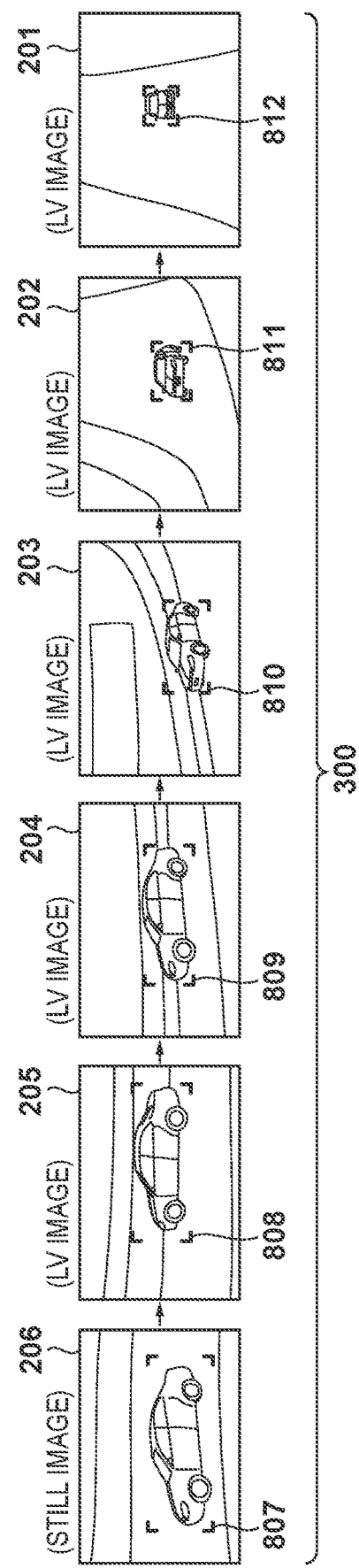
FIG. 8 is a diagram showing an example of tracking a subject starting from a still image toward LV images according to the embodiment.

In step S1003, the subject tracking unit 106D takes the still image with LV images corresponding to the selected still image as a learning target, and determines whether or not there is an LV image taken immediately before the still image. If not, the process ends. On the other hand, if there is an LV image taken immediately before the still image, the process proceeds to step S1004, the subject tracking unit 106D controls to track the subject on the LV images in chronological order toward older ones, with respect to the subject in the still image, for the still image with LV images to be learned, and estimate the subject area. Here, a specific example of tracking the subject performed at this time is shown in FIG. 8 in a case where the still image with LV images 300 shown in FIG. 3 is used. As described above, the still image with LV images 300 includes the still image 206 and the LV images 201 to 205. Among those images, the LV image 201 is shot at the earliest timing, followed by the LV images 202, 203, 204, 205, and the still image 206, in this order.

When a rectangular area 807 of a vehicle as the subject is designated in the still image 206, the subject tracking unit 106D detects the vehicle as the subject from the LV image 205 shot immediately before the still image 206. When the subject tracking is successful and the subject is detected (YES in step S1005), the rectangular information indicating the subject area detected in the LV image 205 is stored in the training data storage unit 108 as training data (step S1006).

Then, the process returns to the process of step S1003, and the above-described process is repeated for the LV image 204 shot immediately before the LV image 205.

In this way, the subject is tracked while tracing back the LV images 205 to 201 in time, and the rectangular areas 808 to 812 in the LV images 205 to 201 are inferred. In this way, training data is also generated with respect to the LV images 205 to 201.

On the other hand, if the subject tracking fails and the subject cannot be found (NO in step S1005), the process proceeds to step S1007 and the process is terminated as the subject being lost.

The tracking process of the subject tracking unit 106D can be realized by using a known technique such as motion vector detection.

If the captured image does not move, even if the LV images are used as training images, they cannot be used as additional training data. Further, it is not efficient to use all the LV images for learning if the difference between the frames of the LV images is small. Therefore, an inter-image difference detection unit (not shown) may be further provided, and while the difference in image or subject area between an LV image used for generating training data and a still image or an LV image used as the training data last time falls below a predetermined threshold, the former LV image is not used as training data, and this LV image may be thinned out.

Figure 9:
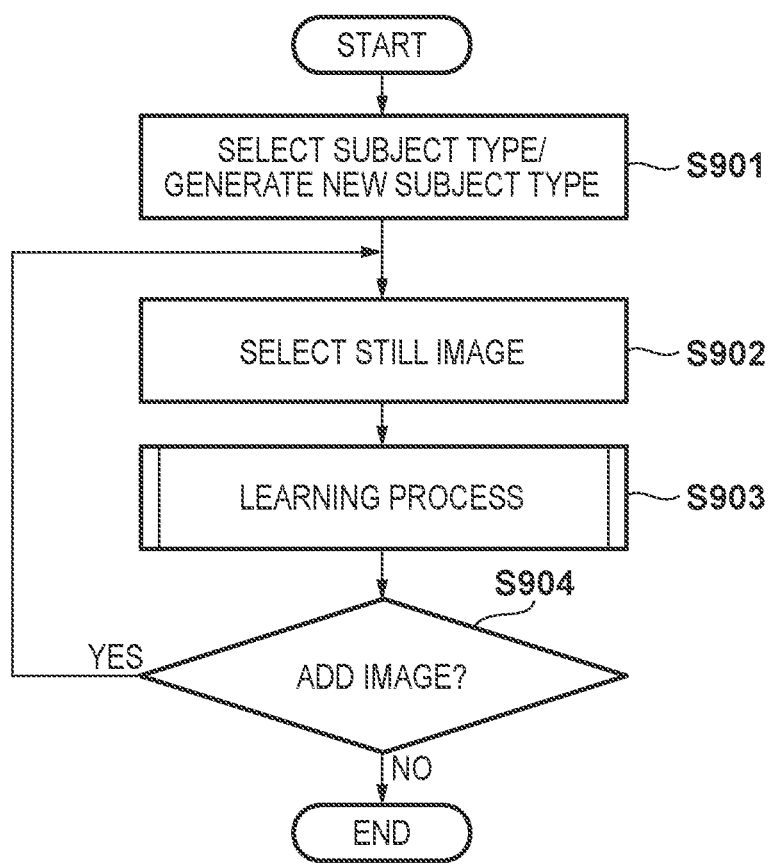
FIG. 9 is a flowchart illustrating a detailed flow of an overall learning process for subject recognition according to the embodiment.
Figure 10:
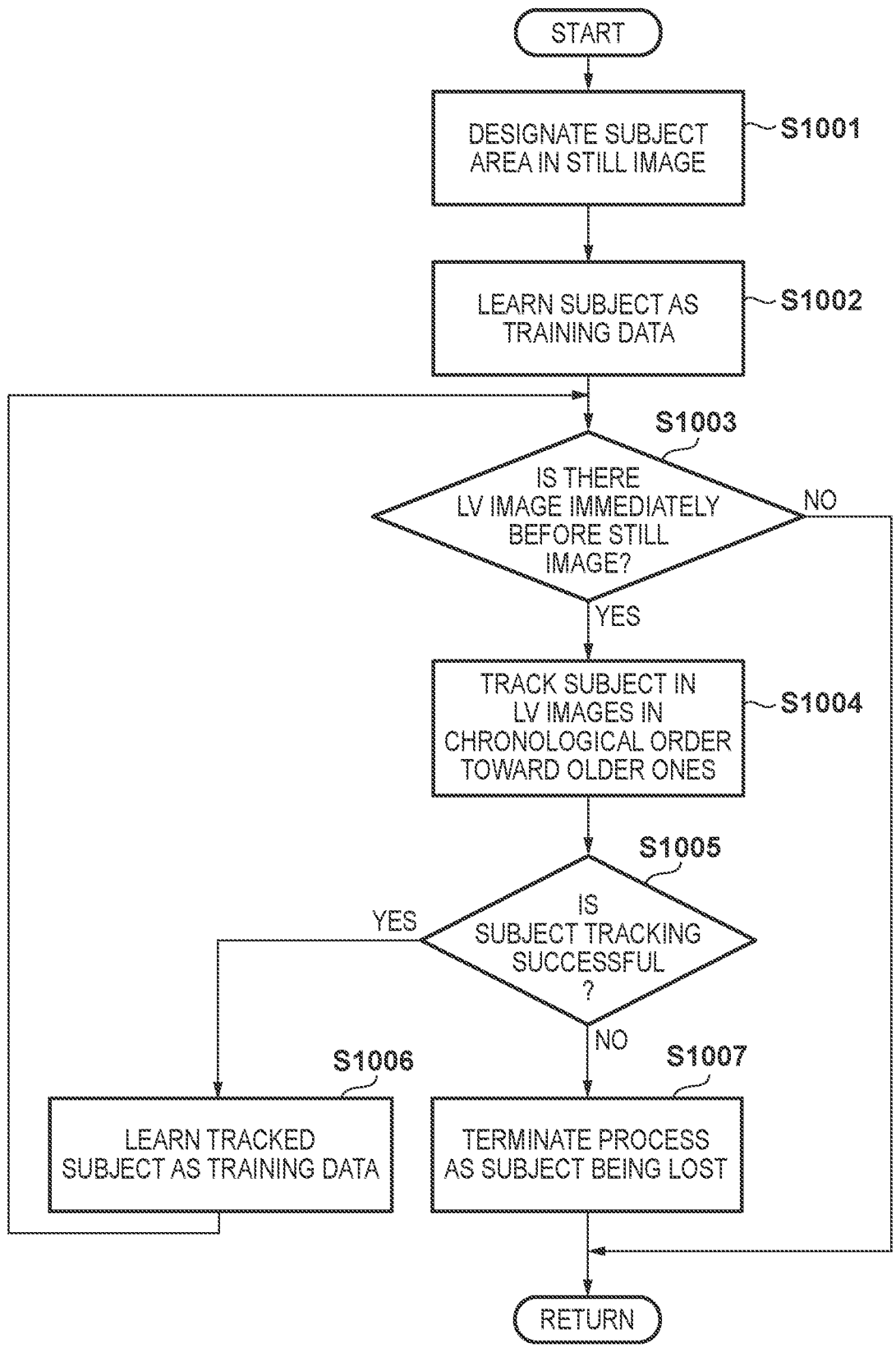
FIG. 10 is a flowchart illustrating a detailed flow of a learning process for subject recognition according to the embodiment.

When the learning process shown in FIG. 10 is completed, the process proceeds to step S904 in FIG. 9. In step S904, it is determined whether or not to add a still image to be registered as training data, and if yes, the process returns to step S902 and the above processes are repeated. If not, the process is terminated.

Further, in the present embodiment, the captured image storage unit 103, the training data generation unit 106, the training data storage unit 108 and the learning unit 109 are arranged in the image capturing apparatus 100 and the processes by these units are performed in the image capturing apparatus 100, but the present invention is limited to this. An image capturing apparatus may be formed by configuring part or all of these units on a cloud and performing processes on the cloud via the communication unit (not shown) in the image capturing apparatus 100, or by performing processes in an information processing device such as a personal computer and connecting the information processing device to the image capturing apparatus 100.

As described above, by using not only the still image taken by the user but also the live view images captured immediately before the still image, it is possible to efficiently increase the amount of the training data that can be used for machine learning for subject detection.

Then, the learning unit 109 performs learning using the training data stored in the training data storage unit 108 as described above, generates an inference model, and stores it in the inference model storage unit 110.

(Inference Function)

Finally, an inference function of the image capturing apparatus 100 will be explained. The inference function is a function of detecting a subject from a shot image based on the inference model obtained by the above-mentioned learning function. Here, an example of detecting a subject during shooting live view images to assist shooting will be described.

Figure 11:
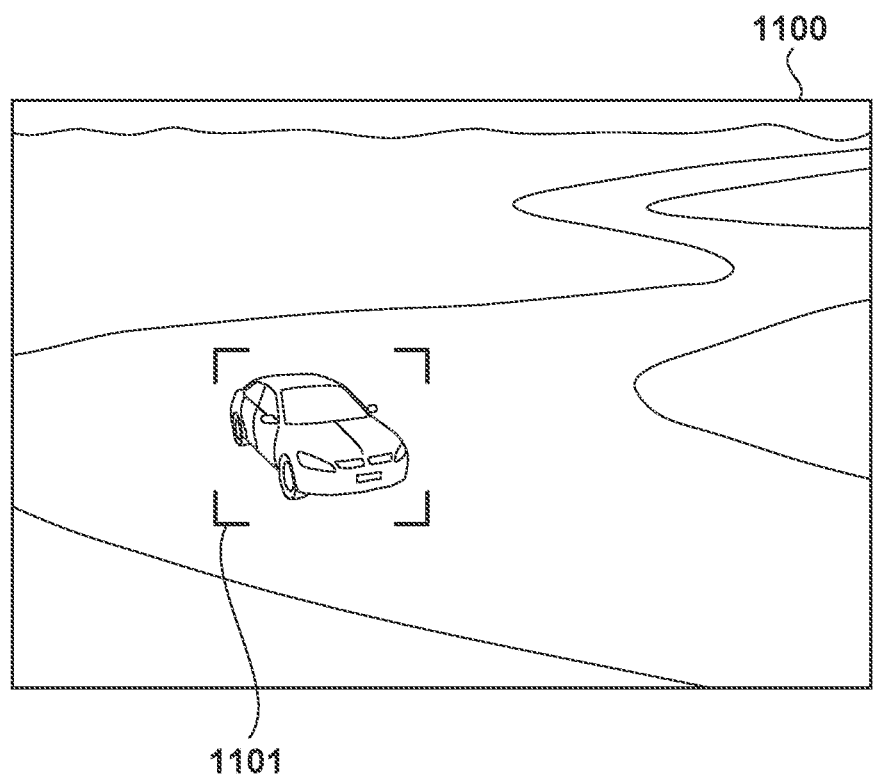
FIG. 11 is a diagram showing an example in which a subject frame for surrounding a subject inferred using a learned inference model is superimposed on a live view image according to the embodiment.

The inference unit 111 acquires an LV image from the LV image storage unit 105 and performs inference (subject detection) based on the learned inference model recorded in the inference model storage unit 110. As a result of the inference, information on the subject type and a rectangular area inscribing the subject is obtained. This information is hereinafter referred to as "subject position information". The subject position information is recorded in the subject position information storage unit 112. The operation/display unit 107 superimposes a subject frame on the displayed live view image by using the subject position information. This allows the user to know when the camera is recognizing the subject. FIG. 11 is a diagram showing an example in which the subject frame of the subject estimated using the learned inference model is superimposed and displayed on the live view image.

In addition, the imaging unit 101 and the image processing unit 102 can also use the subject position information to focus and adjust exposure on the subject and perform optimum image processing according to the subject type.

Further, if it is configured so that the user selects which of the learned subject types to be detected, it is possible to detect only the subject that the user wishes to detect according to the shooting situation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-122345, filed on Jul. 16, 2020 which is hereby incorporated by reference herein in its entirety.

What is claimed is:

1. An information processing apparatus comprising:
a storage unit that stores a first image acquired in response to a shooting instruction and a plurality of second images automatically acquired before the first image;
a specifying unit that specifies a subject in the first image;
a detection unit that detects the subject specified by the specifying unit in the plurality of second images acquired before the first image; and
a control unit that controls to adapt a plurality of sets each contains information on a region of the subject detected in each of the plurality of second images and the second image associated with the information as learning data,
wherein each unit is implemented by one or more processors, circuitry or a combination thereof, and
wherein, in a case where a difference between the first image and the second image is smaller than a predetermined threshold, the detection unit does not perform the detection on the second image.

2. The information processing apparatus according to claim 1, wherein the specifying unit specifies the subject in the first image by being designated by the user.

3. The information processing apparatus according to claim 1, wherein the specifying unit specifies the region of the subject in the first image by contour extraction.

4. The information processing apparatus according to claim 1, wherein the detection unit detects the subject in the plurality of second images by performing tracking process that tracks the subject in the first image specified by the specifying unit.

5. The information processing apparatus according to claim 4, wherein the detection unit performs the tracking process by tracking back the plurality of second images in time.

6. The information processing apparatus according to claim 4, wherein a moving vector is detected in the tracking process.

7. An image capturing apparatus comprising:
an image sensor;
a storage unit that stores a first image acquired in response to a shooting instruction and a plurality of second images automatically acquired before the first image;
a specifying unit that specifies a subject in the first image;
a detection unit that detects the subject specified by the specifying unit in the plurality of second images acquired before the first image;
a control unit that controls to adapt a plurality of sets each contains information on a region of the subject detected in each of the plurality of second images and the second image associated with the information as learning data;
a learning unit that generates an inference model for inferring the subject based on the information of the region of the subject detected by the detection unit; and
an inference unit that infers the region of the subject in an image shot by the image sensor using the inference model generated by the learning unit,
wherein each unit is implemented by one or more processors, circuitry or a combination thereof, and
wherein, in a case where a difference between the first image and the second image is smaller than a predetermined threshold, the detection unit does not perform the detection on the second image.

8. The image capturing apparatus according to claim 7, further comprising a display unit that superimposes an expression indicative of the region of subject inferred by the inference unit on an image shot by the image sensor.

9. An image capturing apparatus comprising:
an information processing apparatus comprising a storage unit that stores a first image acquired in response to a shooting instruction and a plurality of second images automatically acquired before the first image, a specifying unit that specifies a subject in the first image, a detection unit that detects the subject specified by the specifying unit in the plurality of second images acquired before the first image, and a control unit that controls to adapt a plurality of sets each contains information on a region of the subject detected in each of the plurality of second images and the second image associated with the information as learning data, an image sensor;

a learning unit that generates an inference model for inferring the subject based on the information of the region of the subject detected by the detection unit; and an inference unit that infers the region of the subject in an image shot by the image sensor using the inference model generated by the learning unit, wherein each unit is implemented by one or more processors, circuitry or a combination thereof, and wherein, in a case where a difference between the first image and the second image is smaller than a predetermined threshold, the detection unit does not perform the detection on the second image.

10. The image capturing apparatus according to claim 9, further comprising a display unit that superimposes an expression indicative of the region of subject inferred by the inference unit on an image shot by the image sensor.

11. An image capturing system comprising:

an information processing apparatus comprising:

a storage unit that stores a first image acquired in response to a shooting instruction and a plurality of second images automatically acquired before the first image;

a specifying unit that specifies a subject in the first image;

a detection unit that detects the subject specified by the specifying unit in the plurality of second images acquired before the first image; and a control unit that controls to adapt a plurality of sets each contains information on a region of the subject detected in each of the plurality of second images and the second image associated with the information as learning data; and an image capturing apparatus comprising:

an image sensor;

a learning unit that generates an inference model for inferring the subject based on the information of the region of the subject detected by the detection unit; and an inference unit that infers the region of the subject in an image shot by the image sensor using the inference model generated by the learning unit, wherein each unit is implemented by one or more processors, circuitry or a combination thereof, and wherein, in a case where a difference between the first image and the second image is smaller than a predetermined threshold, the detection unit does not perform the detection on the second image.

12. An information processing method comprising:

storing a first image acquired in response to a shooting instruction and a plurality of second images automatically acquired before the first image in a storage unit;

specifying a subject in the first image;

detecting the subject specified by the specifying unit in the plurality of second images acquired before the first image; and controlling to adapt a plurality of sets each contains information on a region of the subject detected in each of the plurality of second images and the second image associated with the information as learning data, and wherein, in a case where a difference between the first image and the second image is smaller than a predetermined threshold, the detecting on the second image is not performed.

13. A non-transitory computer-readable storage medium, the storage medium storing a program that is executable by the computer, wherein the program includes program code for causing the computer to function as an information processing apparatus comprising:

a storage control unit that controls to store a first image acquired in response to a shooting instruction and a plurality of second images automatically acquired before the first image in a storage unit;

a specifying unit that specifies a subject in the first image;

a detection unit that detects the subject specified by the specifying unit in the plurality of second images acquired before the first image; and a control unit that controls to adapt a plurality of sets each contains information on a region of the subject detected in each of the plurality of second images and the second image associated with the information as learning data, wherein, in a case where a difference between the first image and the second image is smaller than a predetermined threshold, the detection unit does not perform the detection on the second image.

* * * * *